US009359850B2

(12) United States Patent
Whiddon et al.

(10) Patent No.: US 9,359,850 B2
(45) Date of Patent: Jun. 7, 2016

(54) VARYING RADIAL ORIENTATION OF A POWER CABLE ALONG THE LENGTH OF AN UMBILICAL

(71) Applicant: AKER SOLUTIONS INC., Houston, TX (US)

(72) Inventors: John T. Whiddon, Mobile, AL (US); David L. Hickman, Mobile, AL (US)

(73) Assignee: AKER SOLUTIONS INC., Houston, TX (US)

( * ) Notice: Subject to any disclaimer, the term of this patent is extended or adjusted under 35 U.S.C. 154(b) by 107 days.

(21) Appl. No.: 14/089,106

(22) Filed: Nov. 25, 2013

(65) Prior Publication Data

US 2015/0144374 A1 May 28, 2015

(51) Int. Cl.

| | |
|---|---|
| ***H01B 9/00*** | (2006.01) |
| ***E21B 33/035*** | (2006.01) |
| ***H02G 1/10*** | (2006.01) |
| *H02G 9/12* | (2006.01) |
| *H02G 9/02* | (2006.01) |

(52) U.S. Cl.

CPC .............. *E21B 33/0355* (2013.01); *H02G 1/10* (2013.01); *H02G 9/02* (2013.01); *H02G 9/12* (2013.01); *Y10T 29/49171* (2015.01)

(58) Field of Classification Search

CPC .................................................... H01B 7/0072
USPC ........................................................... 174/47
See application file for complete search history.

(56) References Cited

U.S. PATENT DOCUMENTS 4,346,256 A * 8/1982 Hubbard et al. ................ 174/47
5,146,982 A * 9/1992 Dinkins ....................... 166/65.1
5,813,106 A 9/1998 Haug et al.
6,943,300 B2 * 9/2005 Ekeberg et al. ........... 174/113 R
7,473,844 B2 1/2009 Figenschou et al.
8,304,651 B2 11/2012 Figenschou et al.
2010/0012342 A1 1/2010 Figenschou et al.
2010/0054677 A1 * 3/2010 Figenschou et al. .......... 385/101
2012/0234578 A1 9/2012 Figenschou
2012/0234596 A1 9/2012 Lund
2013/0051740 A1 2/2013 Fogg et al.

FOREIGN PATENT DOCUMENTS

NO 331986 10/2006

OTHER PUBLICATIONS

International Search Report a Written Opinion of the International Searching Authority; issued in PCT Application No. PCT/US14/65256 dated Feb. 4, 2015.

* cited by examiner

*Primary Examiner* — Chau N Nguyen
(74) *Attorney, Agent, or Firm* — Parsons Behle & Latimer

(57) ABSTRACT

A power triad of an umbilical may be rotated during multiple transition lengths to position each power cable of the power triad equally at radial orientation over the length of the umbilical. A first portion of the umbilical includes the triad in a first radial orientation, a second portion of the umbilical includes the triad in a second radial orientation, and a third portion of the umbilical includes the triad in a third radial orientation. The triad is rotated a first one hundred twenty degrees from the first radial orientation to the second radial orientation during a first transition length. The triad is rotated a second one hundred twenty degrees from the second radial orientation to the third radial orientation during a second transition length. The use of three radial orientations along the length of the umbilical may reduce imbalances between the power cables of the triad.

11 Claims, 4 Drawing Sheets

VARYING RADIAL ORIENTATION OF A POWER CABLE ALONG THE LENGTH OF AN UMBILICAL

FIELD OF THE DISCLOSURE

The present disclosure relates to an apparatus and method for varying the radial orientation of a power cable along the length of an umbilical to minimize circuit imbalance. The radial orientation of the power cable can be varied along predetermined segments of the umbilical to minimize balance loss from a plurality of conductions of the power cable due to various elements positioned within an umbilical.

BACKGROUND

An umbilical is a group of elements that connects a subsea wellhead to a surface location providing communications, chemical transport, hydraulic control pressure, electrical controls, and/or electrical power. An umbilical typically includes a plurality of bundles of conduits that are surrounded by a protective sheath. The bundles of conduits may provide communication of fluids, light, electrical power, and/or electrical signals between the surface and a subsea location. The umbilical may include structural components, such as channel members, to secure the bundles in a radial orientation along the length of the umbilical.

An umbilical may be hundreds or even thousands of feet in length in order to reach a subsea location from the surface. The long length of the umbilical may require the insertion of strengthening members, such as steel rods, to help maintain the strength and/or integrity of the umbilical as it extends from the surface to the subsea floor. The use of steel rods and/or other metal components within the interior of the umbilical may lead to power losses and/or imbalances in power conduits traveling along the length of the umbilical. For example, a power conduit that extends the length of the umbilical may include a power triad comprised of three different power cables. The radial orientation of the power triad may be fixed along the entire length of the umbilical, which may lead to one of the power cables of the power triad being positioned closer to a metal support structure and the influence from other circuits than the other two power cables enclosed within the power conduit. The closer proximity of the power cable may lead to higher power losses than the other two power cables causing an imbalanced power loss and/or fluctuation in the power circuit as a whole. The potential for imbalanced power fluctuations between power cables of a power triad may be increased if the cross-section of the structure of the umbilical is asymmetrical.

SUMMARY

One embodiment is a method for positioning a triad of a power cable of an umbilical that comprises positioning a first end of an umbilical at a first location and extending a second end of the umbilical to a second location positioned a determined distances from the first location. The umbilical comprises a first power triad within an exterior sheath of the umbilical, the first power triad comprising a first power cable, a second power cable, and a third power cable. The method comprises positioning the first power triad at a first radial orientation at the first location, wherein the first power cable, the second power cable, and the third power cable are radially spaced around a center axis of the first power triad. The method includes selectively securing the first power triad at the first radial orientation from the first location to approximately one third of the determined distance and releasing the first power triad from the first orientation at approximately one third of the determined distance. The method comprises rotating the first power triad to a second radial orientation around the center axis of the first power triad at approximately one third of the determined distance and selectively securing the first power triad in the second radial orientation from approximately one third of the distance to approximately two thirds of the determined distance. The method comprises releasing the first power triad from the second radial orientation at approximately two thirds of the determined distance and rotating the first power triad to a third radial orientation around the center axis of the first power triad at approximately two thirds of the determined distance. The method comprises selectively securing the first power triad in the third radial orientation from approximately two thirds of the determined distance to the second location.

The first location of the method may be a surface location and the second location of the method may be a subsea location. The second radial orientation may be rotated one hundred twenty degrees in a first rotational direction about the center axis from the first radial orientation. The third radial orientation may be rotated one hundred twenty degrees in the first rotational direction about the center axis from the second radial orientation. Selectively securing the first power triad may include engaging a plurality of tabs with a plurality of structures within the exterior sheath of the umbilical to selectively prevent the rotation of the first power triad about the center axis of the first power triad. Releasing the first power triad from the first radial orientation may include removing a plurality of tabs from a first predetermined length of the first power triad. Releasing the first power triad from the second radial orientation further comprises removing a plurality of tabs from a second predetermined length of the first power triad.

The method may include a second power triad within the exterior sheath of the umbilical, the second power triad comprising a fourth power cable, a fifth power cable, and a sixth power cable. The method may include positioning the second power triad at a first radial orientation at the first location, wherein the fourth power cable, the fifth power cable, and the sixth power cable are radially spaced around a center axis of the second power triad. The method may include selectively securing the second power triad at the first radial orientation from the first location to approximately one third of the determined distance and releasing the second power triad from the first orientation at approximately one third of the determined distance. The method may include rotating the second power triad to a second radial orientation around the center axis of the second power triad at approximately one third of the determined distance and selectively securing the second power triad in the second radial orientation from approximately one third of the distance to approximately two thirds of the determined distance. The method may include releasing the second power triad from the second radial orientation at approximately two thirds of the determined distance and rotating the second power triad to a third radial orientation around the center axis of the second power triad at approximately two thirds of the determined distance. The method may include selectively securing the second power triad in the third radial orientation from approximately two thirds of the determined distance to the second location. The second radial orientation of the second power triad may be rotated one hundred twenty degrees in a first rotational direction about the center axis of the second power triad from the first radial orientation of the second power triad. The third radial orientation of the second power triad may be rotated one hundred twenty degrees in the first rotational direction about the center axis of the second power triad from the second radial orientation of the second power triad.

One embodiment is an umbilical that extends from a first location to a second location that comprises an exterior sheath that extends from a first end of the umbilical at the first location to a second end of the umbilical at the second location. The umbilical includes a first power triad having a center axis positioned within the exterior sheath, the first power triad extends from the first end of the umbilical to the second end of the umbilical. The first power triad is adapted to selectively rotate about the center axis. A first power cable that extends from the first end to the second end of the umbilical is positioned within the first power triad. A second power cable that extends from the first end to the second end of the umbilical is positioned within the first power triad. A third power cable that extends from the first end to the second end of the umbilical is positioned within the first power triad. The first power triad has a first rotational orientation along a first portion of the umbilical, a second rotational orientation along a second portion of the umbilical, and a third rotational orientation along a third portion of the umbilical.

The first power cable, the second power cable, and the third power cable may be radially spaced one hundred twenty degrees apart about the center axis of the first power triad. The second rotational orientation may be one hundred twenty degrees apart from the first rotational orientation about the center axis and the third rotational orientation may be two hundred forty degrees apart from the first rotational orientation about the center axis. The first portion, the second portion, and the third portion of the umbilical may each be approximately one third of the overall length of the umbilical.

The umbilical may include a first transition length and a second transition length. The first transition length may be positioned between the first portion and the second portion of the umbilical and the second transition length may be positioned between the second portion and the third portion of the umbilical. The first power triad may rotate from the first rotational orientation to the second rotational orientation along the first transition length. The first power triad may rotate from the second rotational orientation to the third rotational orientation along the second transition length. The umbilical may include a plurality of locking structures along the length of the first power triad that prevent the rotation of the first power triad along the first, second, and third portions of the umbilical. The plurality of locking structures within the first and second transition lengths may be adapted to permit the selective rotations of the first power triad about the center axis. A portion of the plurality of locking structures located along the first and second transition lengths may be removed to permit the selective rotation of the first power triad about the center axis.

One embodiment is an umbilical comprising an exterior sheath having a length between a first end and a second end. The umbilical comprises a plurality of elements positioned within the exterior sheath positioned along the length between the first end and the second end. The umbilical includes a power triad positioned within the exterior sheath comprising a plurality of electrical conductors, the power triad having a length and a center axis, the power triad extending along the length of the sheath through the plurality of elements. The umbilical includes a plurality of locking mechanisms positioned along the length of the power triad, the locking mechanisms adapted to engage the plurality of elements to selectively prevent the rotation of the power triad about the center axis. A portion of the plurality of locking mechanisms is adapted along a first transition length to permit the rotation of the power cable about the center axis along the first transition length.

The umbilical may include a second portion of the plurality of locking mechanisms adapted along a second transition length to permit the rotation of the power triad about the center axis along the second transition length. The power triad may be rotated a first one hundred twenty degrees in a first direction along the first transition length and may be rotated a second one hundred twenty degrees in the first direction along the second transition length.

Figure 1:
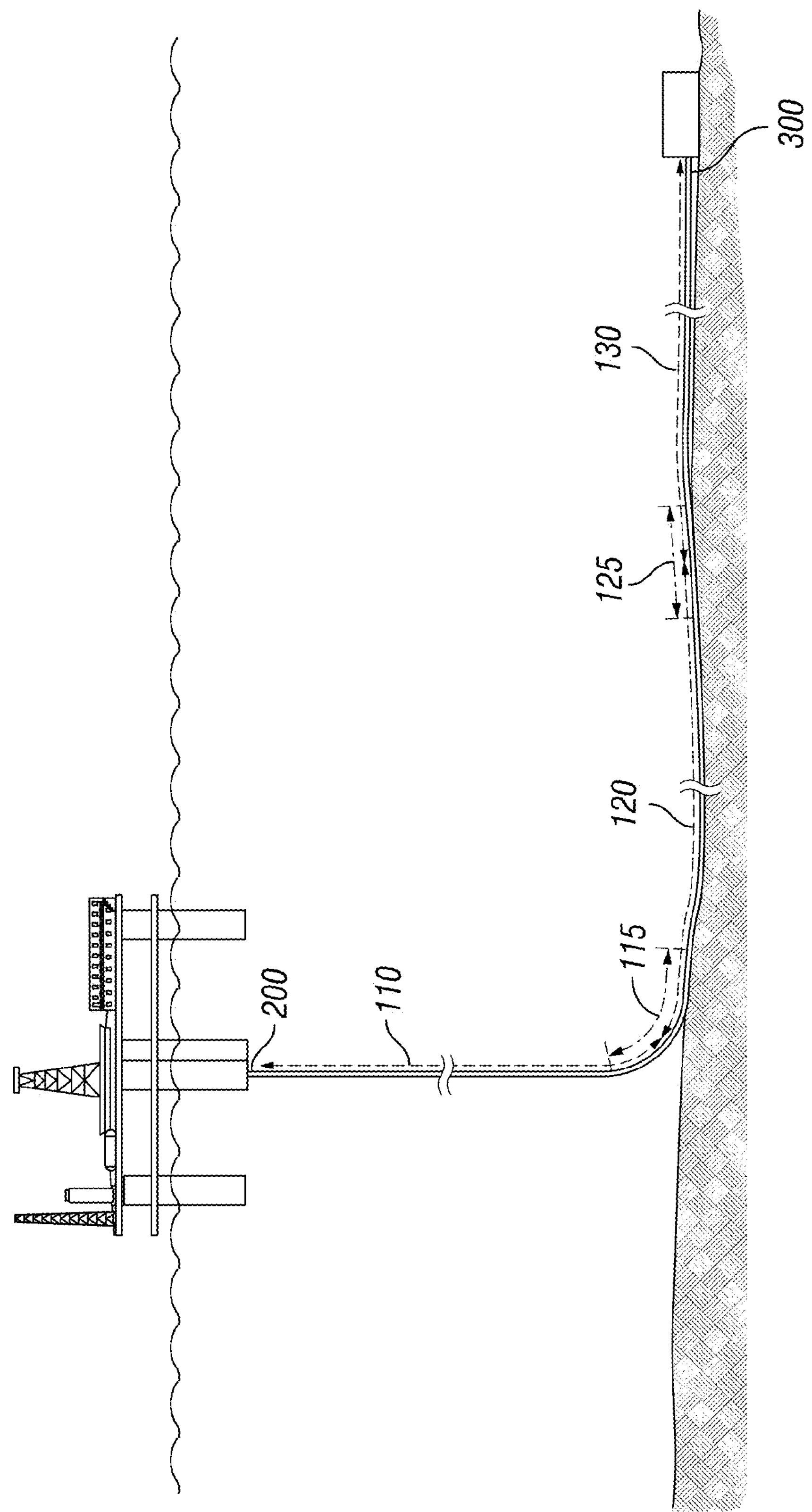
FIG. 1 shows an embodiment of an umbilical extending from the surface to a subsea location.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 shows an umbilical 100 that extends from a surface location 200 to a subsea location 300. However, the umbilical 100 may also be used between two surface locations as well as being extended between two subsea locations. As will be discussed in more detail herein, the umbilical 100 may include three portions that a substantially equal in length, a first portion 110, a second portion 120, and a third portion 130. Further, the umbilical 100 may include a first transition length 115 and a second transition length 125. The three portions 110, 120, and 130 and the two transition lengths 115 and 125 are shown for illustrative purposes in FIG. 1 and are not shown to scale. A power triad 10, 20, or 30 within the umbilical 100 may be rotated between a first radial orientation and a second radial orientation over the length of the first transition length 115 and may be rotated between the second radial orientation and a third radial orientation over the length of the second transition length 125.

Figure 2:
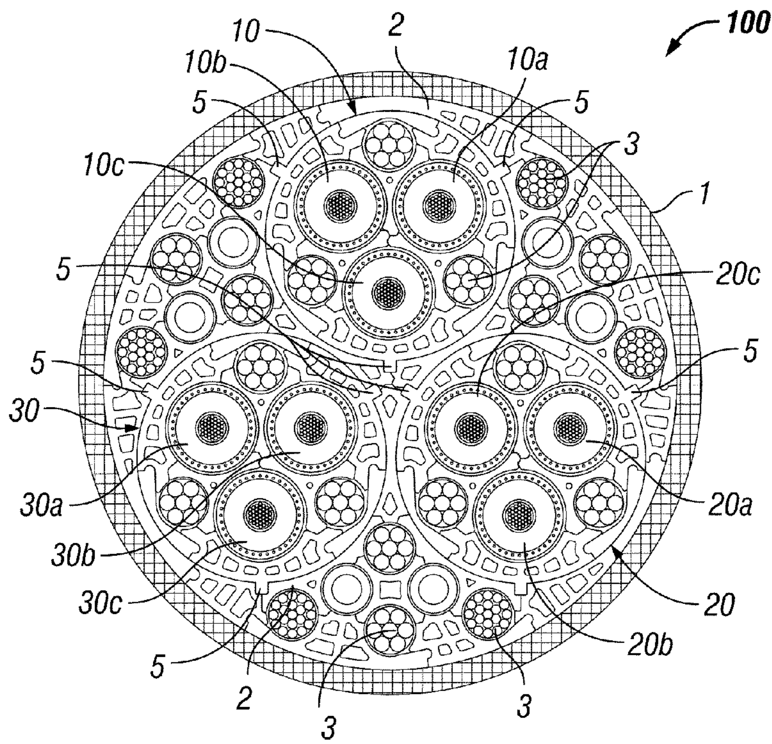
FIG. 2 is a cross-sectional view of an embodiment of an umbilical.

FIG. 2 shows a cross-section of one embodiment of an umbilical 100 of the present disclosure. The umbilical 100 includes an exterior sheath 1 and a plurality of elements within the exterior sheath 1. The number and configuration of the elements within the exterior sheath 1 are for illustrative purposes and may be varied depending on the desired application as would be appreciated by one of ordinary skill in the art having the benefit of this disclosure. The umbilical 100 includes three power triads 10, 20, and 30 positioned within the exterior sheath 1. Each of the power triads 10, 20, and 30 includes three power cables. For example, the first power triad 10 includes a first power cable 10*a*, a second power cable 10*b*, and a third power cable 10*c* positioned radially about a center axis 4*a* of the triad 10. The triad 10 is comprised of various interlocking structures 2 that when engaged prevent the movement of the power cables 10*a*, 10*b*, and 10*c* and other components within the triad 10. Further, the triad 10 includes tabs 5 that engage interlocking structures 2 positioned within the exterior sheath 1 to secure the various components within the umbilical 1 into a desired configuration. The triad 10 includes a plurality of tabs 5 spaced along the length of the umbilical 100 configured to engage interlocking structures 2 also spaced along the length of the umbilical 100 as will be appreciated by one of ordinary skill in the art having the benefit of this disclosure. The umbilical 100 may include structural or strength elements 3 that provide additional strength to umbilical 100 over the entire length of the umbilical 100. The structural elements 3 may be comprised of various materials. For example, the strength elements 3 may be comprised of steel ropes, steel cables, or other materials. The triad 10 may also include strength elements 3.

The umbilical 100 may also include a second power triad 20 having a first power cable 20*a*, a second power cable 20*b*, and a third power cable 20*c* as well as a third power triad 30 having a first power cable 30*a*, a second power cable 30*b*, and a third power cable 30*c*. The number and configurations of the power triads and cables is for illustrative purposes and may be varied depending on the desired application as would be appreciated by one of ordinary skill in the art having the benefit of this disclosure. FIG. 2 shows the first power triad 10, the second power triad 20, and the third power triad 30 each in a first radial orientation about their respective center axes 4*a*, 4*b*, and 4*c*. The power triads 10, 20, and 30 include interlocking structures 2 that selectively lock the power triads 10, 20, and 30 and thus, the power cables 10*a*, 10*b*, 10*c*, 20*a*, 20*b*, 20*c*, 30*a*, 30*b*, and 30*c* in a specified radial orientation about the respective center axes 4*a*, 4*b*, and 4*c*. Specifically, locking tabs 5 may be positioned about the exterior of the triads 10, 20, and 30 that are configured to engage corresponding structures 2 to selectively lock each triad 10, 20, and 30 in a radial orientation. Each of the triads 10, 20, and 30 may be locked in the first radial orientation, shown in FIG. 2, for approximately the first portion 110 of the umbilical 100, which is substantially the first one third of the overall length of the umbilical 100.

As discussed herein, the triads 10, 20, and 30 may be rotated about their respective center axes 4*a*, 4*b*, and 4*c* one hundred twenty (120) degrees for each one third length of the length of the umbilical 100. The equal rotation of the triads 10, 20, and 30 along the length of the umbilical 100 may significantly reduce power imbalances between the three power cables 10*a*, 10*b*, 10*c*, 20*a*, 20*b*, 20*c*, 30*a*, 30*b*, and 30*c* within the triad 10, 20, 30. Imbalances may be due to the inductive effect caused by surrounding components such as structural elements 3, which may aid in the overall strength of the umbilical 100. The structural elements 3, which may be steel ropes or cables, may affect a single power cable 10*a*, 10*b*, 10*c*, 20*a*, 20*b*, 20*c*, 30*a*, 30*b*, or 30*c* that is positioned closer to the structural element 3 than the other power cables 10*a*, 10*b*, 10*c*, 20*a*, 20*b*, 20*c*, 30*a*, 30*b*, or 30*c* in a power triad 10, 20, or 30. The equal rotation of the power triad 10, 20, or 30 may also reduce imbalances due to the power cables 10*a*, 10*b*, 10*c*, 20*a*, 20*b*, 20*c*, 30*a*, 30*b*, and 30*c* themselves if they were to remain the same radial orientation over the length of the umbilical 100.

Figure 3:
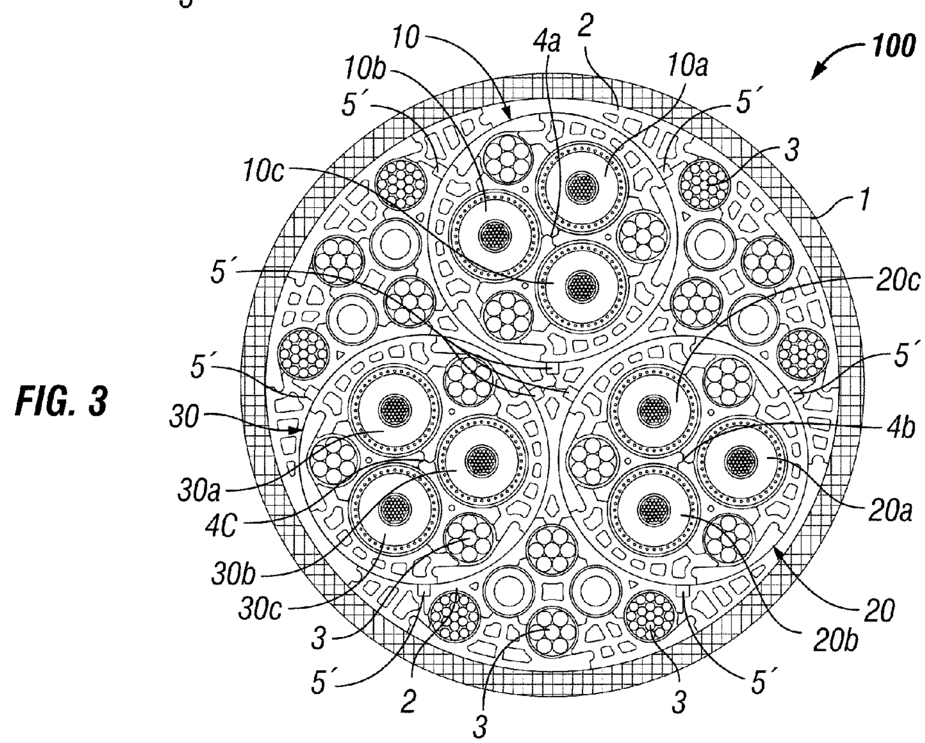
FIG. 3 is a cross-sectional view of an embodiment of an umbilical.

FIG. 3 shows a cross section view of an umbilical 100 with the power triads 10, 20, and 30 being rotated about center axis 4*a* from the first radial orientation (shown in FIG. 2) to the second radial orientation (shown in FIG. 4) during the first transition length 115 of the umbilical. The first transition length 115 is positioned at substantially one third of the overall length of the umbilical. One third of the length of the umbilical 100 could bisect the first transition length 115. However, one third of the length of the umbilical could be positioned at the beginning, end, or at any position along the first transition length 115 as would be appreciated by one of ordinary skill in the art having the benefit of this disclosure. The overall length of the first transition length 115 may be varied. The length of the first transition length 115 needs to be long enough to permit the twisting of the power cables 10*a*, 10*b*, 10*c*, 20*a*, 20*b*, 20*c*, 30*a*, 30*b*, or 30*c* over a length to permit the rotation of the power triads 10, 20, and 30 about center axes 4*a*, 4*b*, and 4*c* from the first radial orientation to the second radial orientation. For example, the length of the first transition length 115 may vary from one foot to twenty feet.

The locking tabs 5 of the power triads 10, 20, and 30 have been removed over the length of the first transition length 115 leaving voids 5' that permit the rotation of the power triads about their respective central axes 4*a*, 4*b*, and 4*c* from the first radial orientation to the second radial orientation. The use of locking tabs 5 and interlocking structures 2 to selectively lock the power triads 10, 20 and 30 in a radial orientation is only one example of selectively locking and selectively unlocking to permit the rotation of power triads over the length of the umbilical 100. Other mechanisms could be used to permit the rotation of the power triads 10, 20, 30 about their respective central axes 4*a*, 4*b*, and 4*c* during each transition length 115 and 125 of the umbilical 100 as would be appreciated by one of ordinary skill in the art having the benefit of this disclosure. As shown in FIG. 3, the power triads 10, 20, and 30 may be rotated in a clockwise direction, such as triads 20 and 30, or rotated in a counter clockwise direction, such as triad 10.

Figure 4:
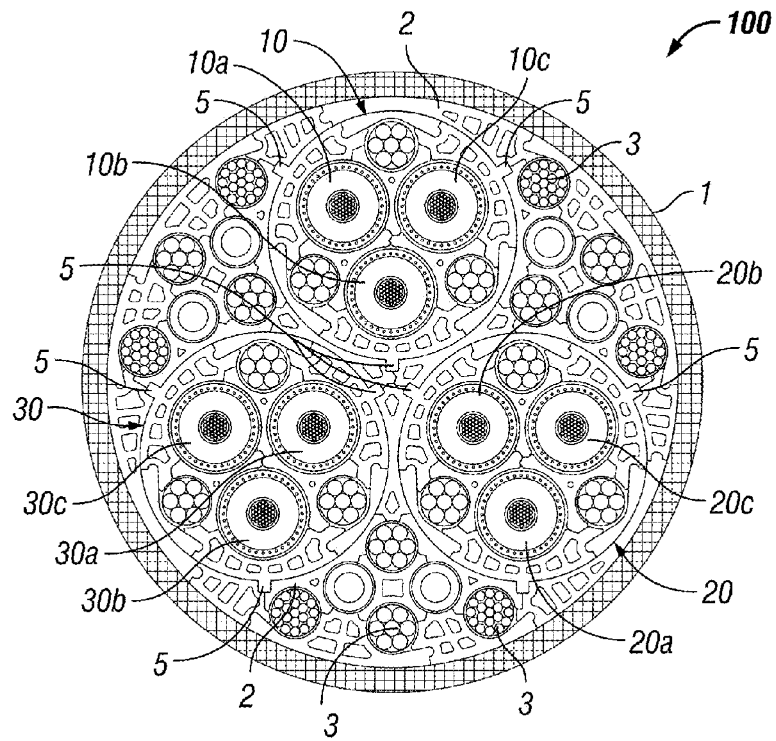
FIG. 4 is a cross-sectional view of an embodiment of an umbilical.

FIG. 4 shows the power triads 10, 20, and 30 in a second radial orientation. The rotation of the power triads 10, 20, and 30 about their respective central axes 4*a*, 4*b*, and 4*c* has positioned the power cables 10*a*, 10*b*, 10*c*, 20*a*, 20*b*, 20*c*, 30*a*, 30*b*, or 30*c* one hundred twenty (120) degrees from their respective positions in the first radial orientation, shown in FIG. 2. Once the power triads 10, 20, and 30 are rotated to the second radial orientation, locking tabs 5 engage the corresponding interlocking structures 2 periodically over the second portion 120 of the umbilical 100 to selectively secure the radial orientations of the power triads 10, 20, and 30. The power triads 10, 20, and 30 remain in the second radial orientation over the second portion 120 of the umbilical 100, which is from substantially one third of the overall length to two thirds of the overall length of the umbilical 100.

Figure 5:
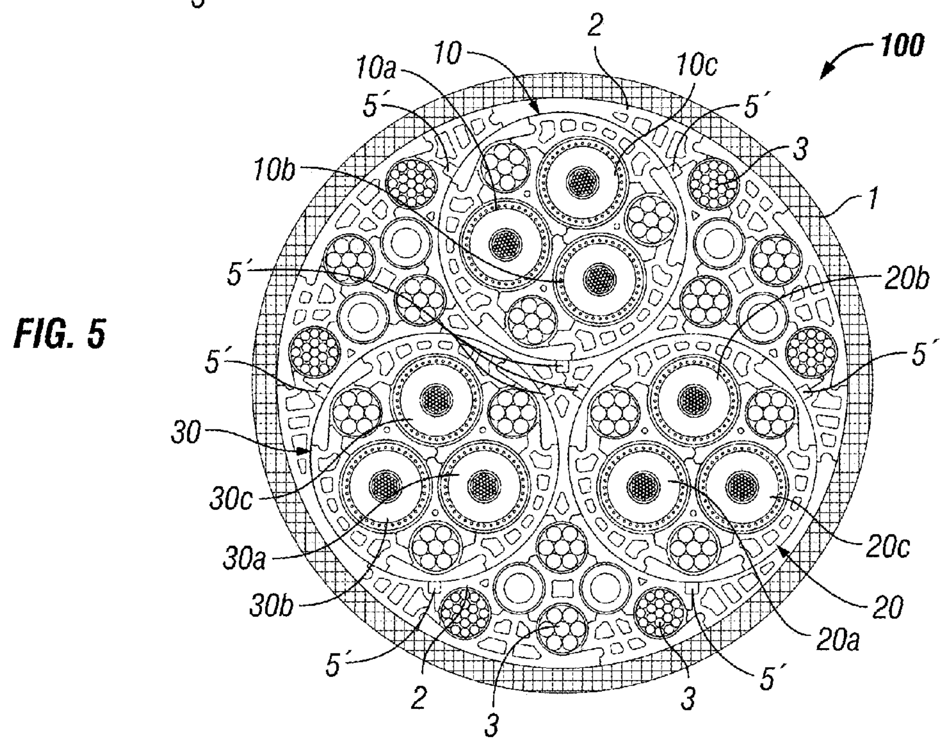
FIG. 5 is a cross-sectional view of an embodiment of an umbilical.

The second transition length 125 of the umbilical is near the end of the second portion 120 of the umbilical 100. FIG. 5 shows the power triads 10, 20, and 30 rotating about their respective central axes 4*a*, 4*b*, and 4*c* from the second radial orientation (shown in FIG. 4) to the third radial orientation (shown in FIG. 6) during the second transition length 125 of the umbilical 100. The point of the umbilical 100 that is two thirds of the overall length could bisect the second transition length 125. However, the two thirds point could be positioned at the beginning, end, or at any position along the second transition length 125 as would be appreciated by one of ordinary skill in the art having the benefit of this disclosure. The overall length of the second transition length 125 may be varied as would be appreciated by one of ordinary skill in the art having the benefit of this disclosure. The length of the second transition length 125 needs to be long enough to permit the twisting of the power cables 10*a*, 10*b*, 10*c*, 20*a*, 20*b*, 20*c*, 30*a*, 30*b*, or 30*c* over a length to permit the rotation of the power triads 10, 20, and 30 from the second radial orientation to the third radial orientation. For example, the length of the second transition length 125 may vary from one foot to twenty feet.

The locking tabs 5 of the power triads 10, 20, and 30 have been removed over the length of the second transition length 125 leaving voids 5' that permit the rotation of the power triads about their respective central axes **4*a*, 4*b*, and 4*c* from the second radial orientation to the third radial orientation. The use of locking tabs 5 and interlocking structures 2 to selectively lock the power triads 10, 20 and 30 in a radial orientation is only one example of selectively locking and selectively unlocking to permit the rotation of power triads over the length of the umbilical 100. Other mechanisms could be used to permit the rotation of the power triads 10, 20, 30 during each transition length 115 and 125 of the umbilical 100** as would be appreciated by one of ordinary skill in the art having the benefit of this disclosure.

Figure 6:
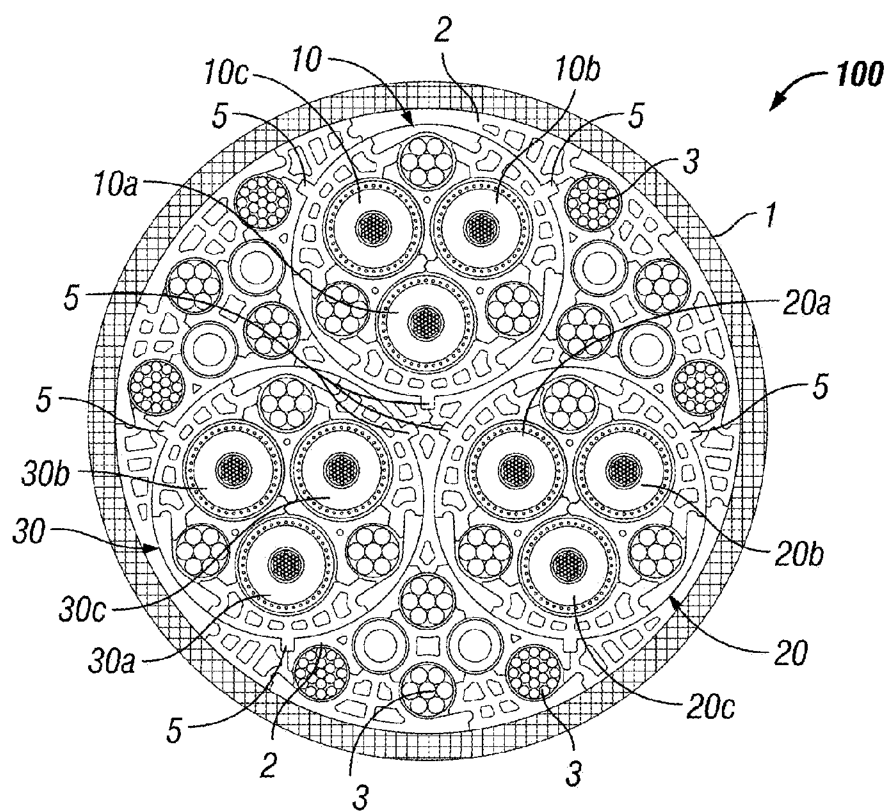
FIG. 6 is a cross-sectional view of an embodiment of an umbilical.

FIG. 6 shows the power triads 10, 20, and 30 in a third radial orientation. The rotation of the power triads 10, 20, and 30 has positioned the power cables **10*a*, 10*b*, 10*c*, 20*a*, 20*b*, 20*c*, 30*a*, 30*b*, or 30*c* one hundred twenty (120) degrees from their respective positions in the second radial orientation, shown in FIG. 4, and two hundred forty (240) degrees from their respective positions in the first radial orientation, shown in FIG. 2. Once the power triads 10, 20, and 30 are rotated to the third radial orientation, locking tabs 5 engage the corresponding interlocking structures 2 to selectively secure the radial orientations of the power triads 10, 20, and 30. The power triads 10, 20, and 30 remain in the third radial orientation over the third portion 130 of the umbilical 100, which is from substantially two thirds of the overall length to the end of the umbilical 100. Thus, each of the power cables 10*a*, 10*b*, 10*c*, 20*a*, 20*b*, 20*c*, 30*a*, 30*b*, and 30*c* are radially positioned equally positioned around the center axes 4*a*, 4*b*, or 4*c* or their respected power triad 10, 20, or 30 over the entire length the umbilical. This uniform distribution of the power cables 10*a*, 10*b*, 10*c*, 20*a*, 20*b*, 20*c*, 30*a*, 30*b*, and 30*c*** over the entire length of the umbilical may prevent imbalances between the cables within a single power triad.

The three portions 110, 120, and 130 of the umbilical 100 may not extend the entire length of the umbilical as would be appreciated by one of ordinary skill in the art having the benefit of this disclosure. For example, a first set of portions 110, 120, and 130 may extend one half of the length of the umbilical 100 and a second set of portions 110, 120, and 130 could extend over the second half of the length of the umbilical 100 permitting the rotation of the of each triad 10, 20, and 30 twice through each radial orientation over the entire length of the umbilical 100. Various sets of three portions 110, 120, and 130 could be used over the entire length of the umbilical permitting the repeated rotation of the triads 10, 20, and 30 as would be appreciated by one of ordinary skill in the art having the benefit of this disclosure.

The umbilical 100 may include more than two transition lengths along the entire length of the umbilical 100. Additionally, the transition lengths may differ for each triad 10, 20, and 30 within an umbilical. For example, the radial orientation of a first triad 10 may be changed only twice during the entire length of the umbilical 100 whereas the radial orientation of a second triad 20 may be changed eight times and the radial orientation of a third triad 30 may be changed twenty six times over the entire length of the umbilical 100. The variation of rotations between the different triads within an umbilical 100 may equally expose each power cable to external influences. The number and direction of each rotation of the triads may be varied between the triads in an effort to minimize potential imbalances. Further, even the direction of rotation may be changed during the variation of radial orientation for a triad. For example, a triad may be rotated 120 degrees for a first change in radial orientation, be rotated another 120 degrees for a second change in radial orientation, and then be rotated 240 degrees in the opposite direction for a third change in radial orientation.

In addition, for applications where potential losses or imbalances may occur at other electrical phases or the like, it is possible to rotate portions of the umbilical to radial positions other than multiples of 120 degrees.

Although various embodiments have been shown and described, the present disclosure is not so limited and will be understood to include all such modifications and variations are would be apparent to one skilled in the art.

| TABLE OF REFERENCE NUMERALS FOR FIGS. 1-6 |
|---|
| 1 - outer sheath of umbilical |
| 2 - interlocking structures within umbilical sheath |
| 3 - structural elements within umbilical sheath |
| 4a - center axis of first electrical triad |
| 4b - center axis of second electrical triad |
| 4c - center axis of third electrical triad |
| 5 - locking tab |
| 5' - void upon removal of locking tab |
| 10 - first electrical triad |
| 10a - first electrical cable in first electrical triad |
| 10b - second electrical cable in first electrical triad |
| 10c - third electrical cable in first electrical triad |
| 20 - second electrical triad |
| 20a - first electrical cable in second electrical triad |
| 20b - second electrical cable in second electrical triad |
| 20c - third electrical cable in second electrical triad |
| 30 - third electrical triad |
| 30a - first electrical cable in third electrical triad |
| 30b - second electrical cable in third electrical triad |
| 30c - third electrical cable in third electrical triad |
| 100 - umbilical |
| 110 - first portion of umbilical |
| 115 - first transition length |
| 120 - second portion of umbilical |
| 125 - second transition length |
| 130 - third portion of umbilical |
| 200 - surface location |
| 300 - subsea location |

What is claimed is:

1. An umbilical that extends from a first location to a second location, the umbilical comprising:

an exterior sheath that extends from a first end of the umbilical at the first location to a second end of the umbilical at the second location;

a first power triad having a center axis positioned within the exterior sheath, the first power triad extends from the first end of the umbilical to the second end of the umbilical, the first power triad is adapted to selectively rotate about the center axis;

a first power cable positioned within the first power triad, the first power cable extends from the first end of the umbilical to the second end of the umbilical;

a second power cable positioned within the first power triad, the second power cable extends from the first end of the umbilical to the second end of the umbilical;

a third power cable positioned within the first power triad, the third power cable extends from the first end of the umbilical to the second end of the umbilical;

wherein the first power triad is locked in a first radial orientation along a length of a first portion of the umbilical, is locked in a second radial orientation along a length of a second portion of the umbilical, and is locked in a third radial orientation along a length of a third portion of the umbilical.

2. The umbilical of claim 1, wherein the first power cable, the second power cable, and the third power cable are radially spaced one hundred twenty degrees apart about the center axis of the first power triad.

3. The umbilical of claim 2, wherein the second radial orientation is one hundred and twenty degrees apart from the first radial orientation about the center axis and wherein the third radial orientation is two hundred and forty degrees apart from the first radial orientation about the center axis.

4. The umbilical of claim 3, wherein the first portion, second portion, and third portion of the umbilical are each approximately one third of a length of the umbilical.

5. The umbilical of claim 1 further comprising a first transition length of the umbilical and a second transition length of the umbilical, the first transition length being between the first portion and the second portion and the second transition length being between the second portion and the third portion, wherein the first power triad rotates from the first radial orientation to the second radial orientation along the first transition length of the umbilical and wherein the first power triad rotates from the second radial orientation to the third radial orientation along the second transition length of the umbilical.

6. The umbilical of claim 5 further comprising a plurality of locking structures along the length of the first power triad that prevent the rotation of the first power triad along the first portion, second portion, and third portion, wherein the plurality of locking structures within the first transition length and second transition length are adapted to permit the selective rotation of the first power triad about the center axis.

7. The umbilical of claim 6, wherein a portion of the plurality of locking structures located along the first transition length and second transition length are removed to permit the selective rotation of the first power triad about the center axis.

8. An umbilical comprising:

an exterior sheath having a length between a first end and a second end;

a plurality of elements positioned within the exterior sheath positioned along the length between the first end and the second end;

a power triad positioned within the exterior sheath comprising a plurality of electrical conductors, the power triad having a length and a center axis, the power triad extending along the length of the sheath through the plurality of elements;

a plurality of locking mechanisms positioned along the length of the power triad, a first portion of the locking mechanisms adapted to engage the plurality of elements to selectively prevent the rotation of the power triad about the center axis, thereby locking a radial orientation of the power triad along a length of a portion of the length of the sheath;

wherein a second portion of the plurality of locking mechanisms is adapted along a first transition length to permit the rotation of the power triad about the center axis along the first transition length.

9. The umbilical of claim 8 further comprising a third portion of the plurality of locking mechanisms that is adapted along a second transition length to permit the axial rotation of the power triad about the center axis along the second transition length.

10. The umbilical of claim 9, wherein the power triad is rotated a first one hundred twenty degrees in a first direction along the first transition length.

11. The umbilical of claim 10, wherein the power triad is rotated a second one hundred twenty degrees in the first direction along the second transition length.

* * * * *